Jan. 27, 1970　　TOMIJI OGURI ET AL　　3,491,576
METHOD OF PRODUCING A TUBULAR BODY FROM A CYLINDRICAL
METALIC MATERIAL IN COLD WORKING
AND AN APPARATUS THEREOF

Filed Sept. 18, 1967　　　　　　　　　　5 Sheets-Sheet 1

INVENTOR
TOMIJI OGURI
AKIRA KORINAMI
TAKAO MINOURA

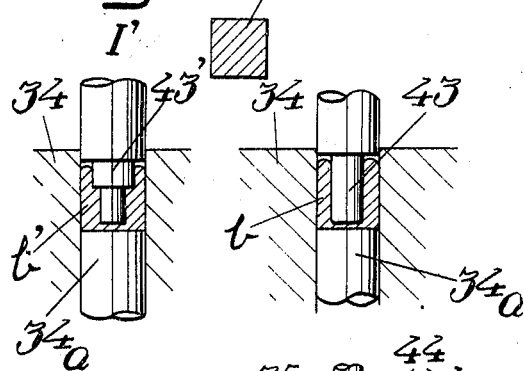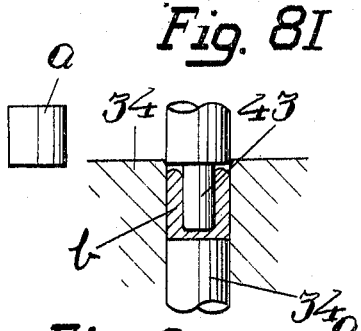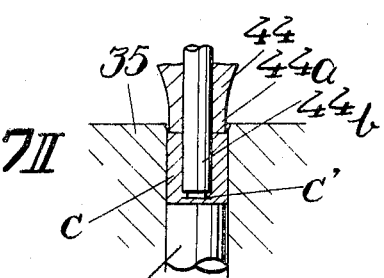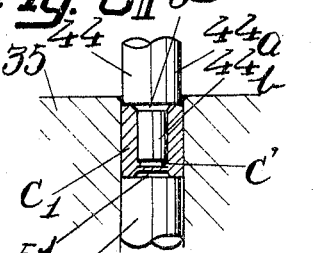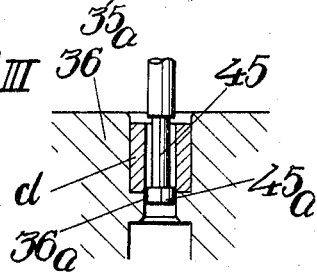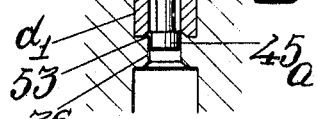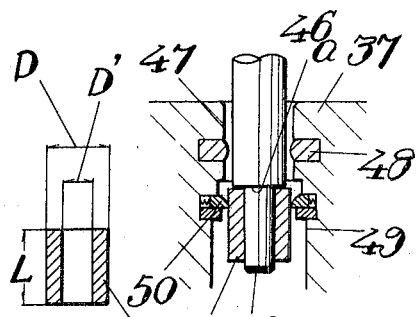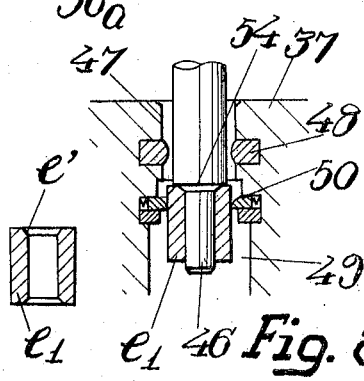

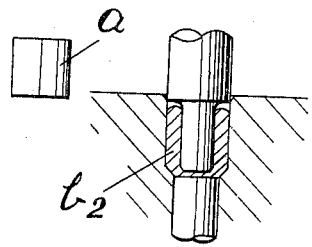
Fig. 9I
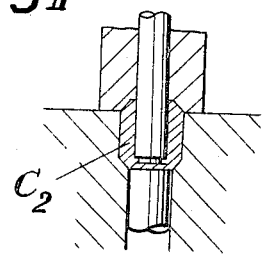
Fig. 9II
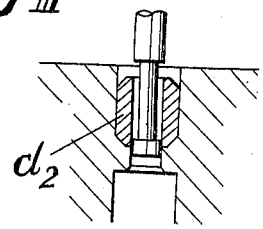
Fig. 9III
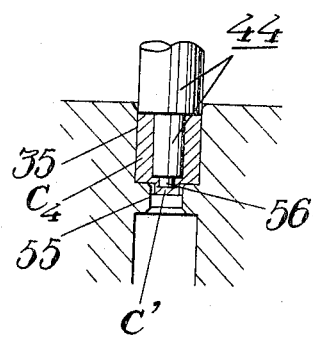
Fig. 10II
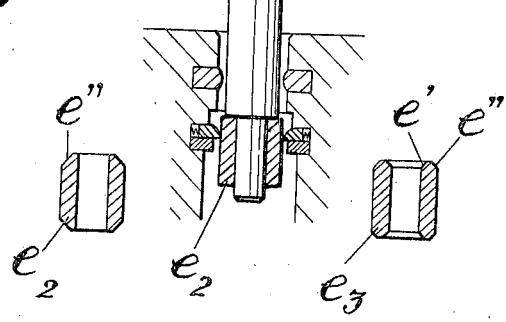
Fig. 9IV United States Patent Office 3,491,576
Patented Jan. 27, 1970

3,491,576
METHOD OF PRODUCING A TUBULAR BODY FROM A CYLINDRICAL METALIC MATERIAL IN COLD WORKING AND AN APPARATUS THEREOF
Tomiji Oguri, Seto, Akira Kominami, Nagoya, and Takao Minoura, Inazawa, Japan, assignors to Kabushiki Kaisha Tokai Rika Denki Seisakusho, Nishikasugai-gun, Aichi-Prefecture, Japan
Filed Sept. 18, 1967, Ser. No. 668,545
Claims priority, application Japan, Feb. 4, 1967, 42/7,397
Int. Cl. B21d 22/00; B21j 11/00
U.S. Cl. 72—356                                        6 Claims

ABSTRACT OF THE DISCLOSURE

This invention discloses a method of producing a tubular body from a cylindrical metalic material which comprises a combined press processing system including (1) a pressing process to form from the cylindrical metalic material a tubular body having an inner and outer diameter substantially equal to those of the desired tubular body and having a blind end, (2) a compressing process to give the tubular body obtained by the above process (1) a longitudinal length substantially equal to that of the desired tubular body and simultaneously to project along the axial direction thereof and within a diameter corresponding to that of the inner diameter of the desired tubular body surplus of the metalic material left by the compression onto the blind end, and (3) a punching process to punch through the blind end together with the surplus of the metalic material projected on the said end. This invention further discloses an apparatus which embodies the above processing system.

---

This invention relates to a method of producing a tubular body from a cylindrical metalic material in cold working, and an apparatus thereof.

More particularly, the present invention relates to a press molding process molding a metalic material into a tubular finished product having a precisely molded length, outer diameter, inner diameter of a straight or stepped bore and flat or tapered upper and lower edges, and also to a press molding apparatus automatically performing a whole of multistage processes including the primal stage of a metalic material feed process through the final stage of a finished product discharging process by a combined application of a transfer method.

The primal object of the present invention is to mold a metalic material into a tubular product finished in extreme precision so as to meet the industrial standard by means of press molding process. Another object is to collect refuses and surplus of a metalic molding material left by an intermediate press work and project them into a space formed at the under part of a blind tubular rough product where a punching member is thrust through in the succeeding process, so that said refuses and surplus are completely punched away without creating any crack or break around the outer periphery of a main body of the blind tubular rough product.

Further another object is to collect dimensional surplus materials inevitably borne with a metalic material to be molded into a small accumulation and cast them away together with refuses, so that an extremely precise finished product may be produced. The fourth is to produce in mass-production a tubular finished product having complete tubular configuration designed on various configuration within an allowable limit by press molding process so as to meet the industrial demand. Further another object of the present invention is to permit a selection of press molding process within a limit of press molding processes provided in the present invention so as to attain the object of item (4). The sixth is to confine a loss of a metalic material to the minimum quantity. And the final object is to enhance the productivity and efficiency for production of a solid tubular finished product by application of multistages process system in combination with a transfer method serving to increase of production speed.

In order to attain those objects disclosed hereinabove, a press molding process in the present invention comprises; pressing the cylindrical metalic material having volume slightly larger than that of the tubular body into a tubular body having inner and outer diameters substantially equal to those of the firstly-mentioned tubular body and having a blind end, the other open end being remained unpressed; compressing the secondly-mentioned tubular body from the both ends thereof into a tubular body having a longitudinal length substantially equal to that of the firstly-mentioned tubular body while keeping outer and inner diameters thereof as they are, surplus of the metalic material left by the compression being projected onto the blind end along the axial direction of the tubular body and within a diameter corresponding to that of the most reduced part of the inner diameter of the firstly-mentioned tubular body and punching through the thirdly-mentioned tubular body produced to have the outer and inner diameters and the longitudinal length substantially equal to those of the firstly-mentioned tubular body along the axial direction and in the diameter corresponding to that of the most reduced part of the inner diameter thereof, blind end thereof being punched through with the surplus of the metalic material projected thereon in the afore-mentioned diameter.

The press molding apparatus in the present invention comprising members so arranged that respective of the afore-mentioned processes may be operated connectingly and automatically by adoptation of a transfer method.

In the companying drawings which show a preferred embodiment of a processes molding apparatus in the present invention:

FIG. 1 *a* and *b* are, respectively, vertical longitudinal sections of a press molding apparatus taken along the line I—I in FIG. 2, divided into two parts for the sake of clarity;

FIG. 2 *a* and *b* respectively show a plane view of a press molding apparatus cut away a part of an upper plate and shown a guide plate member of the same, divided into two parts for the sake of clarity;

Figure 1A:
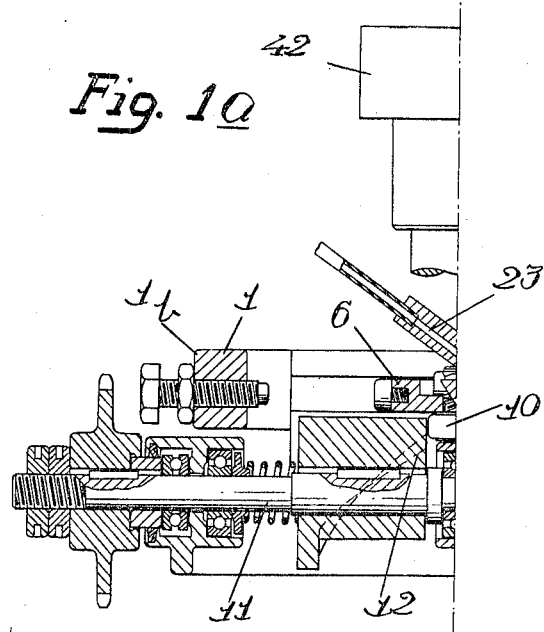

FIGS. 7 to 9 I to IV and FIG. 10 II show explanatory views of processes of the present invention.

In the drawings, numeral 1 indicates a frame member formed in an elongated configuration defined its right part by an end 1*a* and its left part by an end 1*b* and provided with a deep groove 2 engraved along the elongated upper edge thereof, and the upper part of said elongated edge is tapered 2*a* towards the under right part extending to a product discharging opening 2*b*. 3 indicates a press bed member insertedly mounted to said deep groove 2. Over other parts excluding the left part 1*b* of said frame member 1 mounted said press bed members a material feed member 4 and a guide plate member 5 are fixedly covered with interposition of a transfer plate member 6. Said transfer plate member 6 is fitted closely and in a way of permitting of a sliding motion to a space formed between the upper surface of the press bed member 3 and the under surfaces of the material feed member 4 and the guide plate member 5 and supported at one end by a shaft 7 communicating with a rod 8. Respective end of said sliding rod 8 is hitched by a spring 9 pushed out to cause a sliding motion of said transfer plate member 6 and secured to respective side of the frame member 1. 10 indicates a roller pivoted to the under surface of the transfer plate member 6 and slidingly contacted with a rotary shaft 11 projected one end to a space formed cuttingly at the end part 1b of the frame member 1. Said roller 10 contacting with a cam 12 and being pushed towards said roller 10 by force of the spring 9 is pushed out to the space by rotation of said cam 12. The transfer plate member 6 is slidingly reciprocated by the interactions of the roller 10, the cam 12, the rotary shaft 11 and the spring 9.

13 indicates a slot engraved on the transfer plate member 6 along the elongated direction thereof and provided with two paralleled side walls facing with each other. 14 indicates a groove engraved against respective of said side walls of the slot in the form of a reverse $u$ and in parallel with said slot 13 and spaced 15 at a regular distance at the bottom part thereof provided with a projection 16. Said groove 14 includes a pair of clamping plates member of a plural member accommodated therein at a regular distance. Said pair of clamping plates 18 respectively pivoted one end to the transfer plate member 6 and projected other end forming a clamping arm 19 into the slot 13 through the space 15. Projection into the slot 13 of said clamping arm is controlled by a stopper 20 provided thereto and operated in engagement with a projection 16 and enforced by a spring 21.

The material feed member 4 includes a material feed passage 23 provided along a wall 22 sloping towards the slot 13 and communicating one end part therewith so as to feed slidingly a metalic molding material $a$ in a row and communicated one lower end with a material feed opening 24 extending its lower part to the slot 13 opening to an enlarged cylindrical passage 25 covered its upper end with a cover 27 provided with an air supply pipe 26. Said cylindrical passage 25 includes a hydraulic piston 29 being connected its upper end with said air supply pipe 26 and its under end with a piston rod 30 and being movable vertically by pressure of compressed air supplied from said pipe 26 and a spring 28 fixed thereto and operable in cooperation with discharge of compressed air, said piston rod 30 being descended towards the material feed opening 24 until its free under end comes to be horizontally in alignment with an upper wall of the material feed passage 23 so as to serve for an upper wall of the material feed opening 24 to hold a metallic molding material fed thereinto and being secured its upper end with a shoulder 31 being descended to contact its under end with the bottom surface of the cylindrical passage 25 and controlling an excessive descent of said hydraulic piston 29. 32 indicates a rod provided to the press bed member 3 and located at the position corresponding with the piston rod 30. Said rod is pushed towards the material feed opening 24 by force of a spring 33 until its free upper end comes to be in a horizontal alignment with the under wall of the material feed passage 23 so as to serve for an under wall of the material feed opening 24 and receive a molding material. 34 to 37 indicate dies provided to the press bed member 3 at positions exactly corresponding with those of the clamping arms 19 and communicated respective of their upper ends arranged in alignment with that of the rod 32 with the slot 13. Dies 34 and 35 are provided with ejectors 34a and 35a inserted thereinto from their under ends and served as bottoms of respective dies. Details of other dies 36 and 37 will be disclosed later. 38 to 41 indicate punch guides provided at positions exactly corresponding with those of dies 34 to 37 inside the guide plate member 5 and the under parts of the punch guides 38 and 40 are projected into the slot 13 so as to serve for strippers of a molding product. 43 to 46 indicate punching members fixedly secured their upper ends to an actuating member 42 being connected with a cylindrical drum and being actuated vertically and located at positions corresponding with those of dies 34 to 37 and punch guides 38 to 41 so that their free under ends having demanded configurations and longitudinal lengths may be thrust into respective dies 34 to 37 through respective punch guides 38 to 41. Said punching members 43 to 46 have respectively different longitudinal lengths and configurations; the punching members 43 and 44 have longitudinal lengths not to reach the free upper ends of ejectors 34a and 35a when said punching members 43 and 44 are descended to the limit by operation of the actuating member 42, the punching member 45 has the length being long enough to be passed through the die 36, and the punching member 46 is long enough to be passed through the die 37 and the press bed member 3. The punching member 44 is composed of an outer member 44a slidingly movable along an inner member 44b secured its upper end to the actuating member 42. Said outer member 44a is pushed slidingly downwards by force of a spring 44c secured to the upper part thereof until its free under end makes an even level with a free under end of the inner member 46b. The difference in length between the outer member 44a and the inner member 44b determines a longitudinal length of a tubular product when a metalic molding material is molded in a due process. Said punching member 44 may be constructed in a solid body that the outer member 44a and the inner member 44b having respectively different lengths are fixedly united.

In this case the bottom part of the punch guide 39 must be projected into the slot 13 so as to serve for a stripper as in the case of the punch guide 38 set forth. Configurations of the punching members 43 to 46 will be described in details later.

Figure 1B:
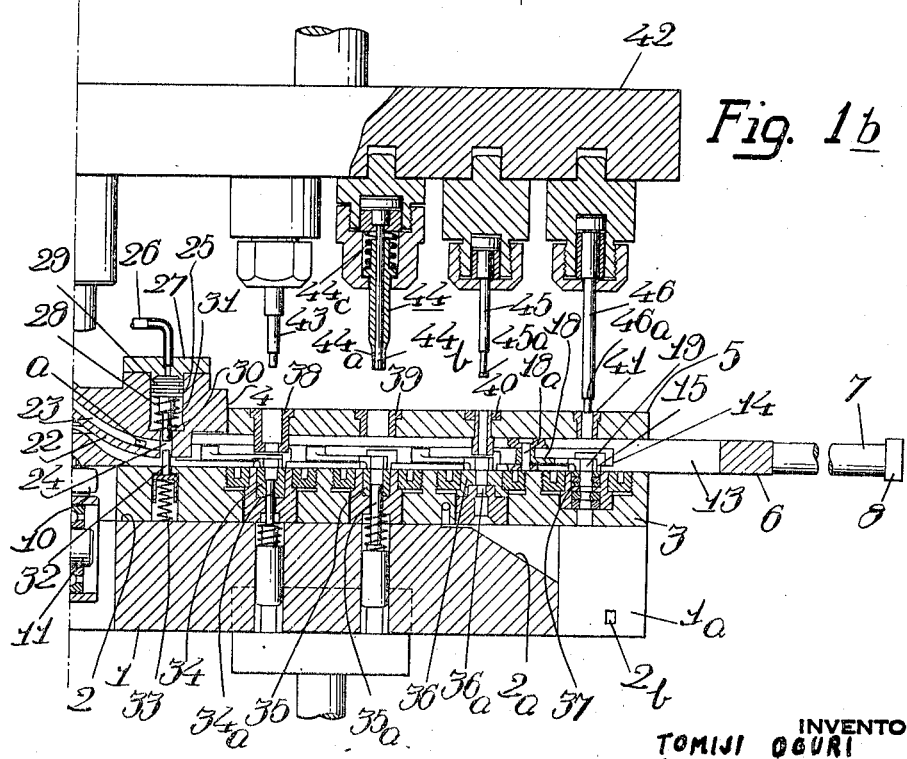
Figure 2A:
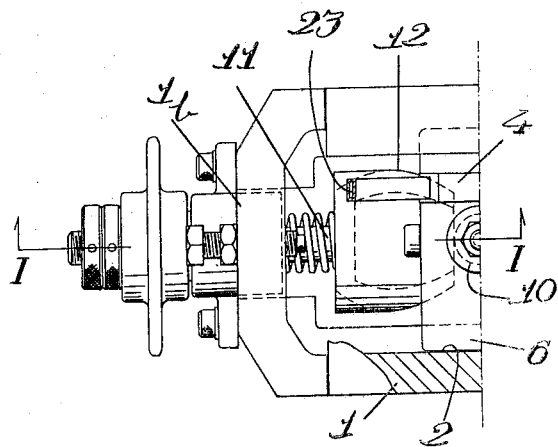
Figure 2B:
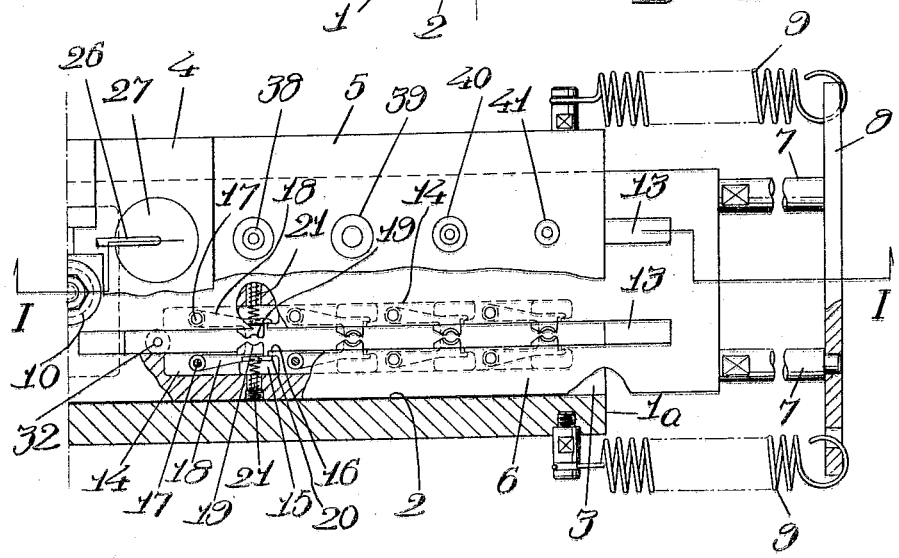
Figure 3:
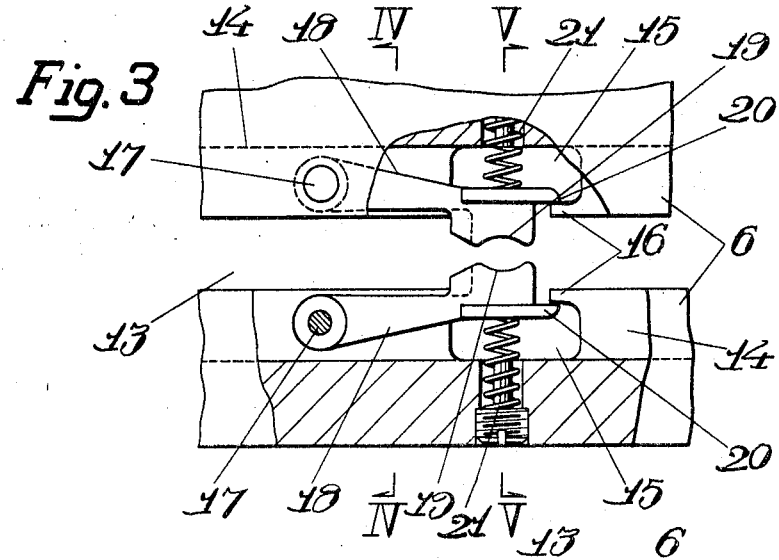
FIG. 3 shows an enlarged plane view of a pair of clamping plates.
Figure 4:
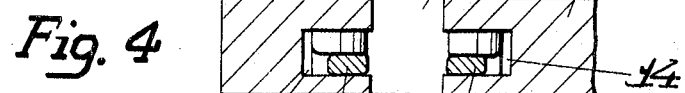
FIG. 4 shows an enlarged cross-sectional view of the clamping plates taken along the line IV—IV in FIG. 3.
Figure 5:
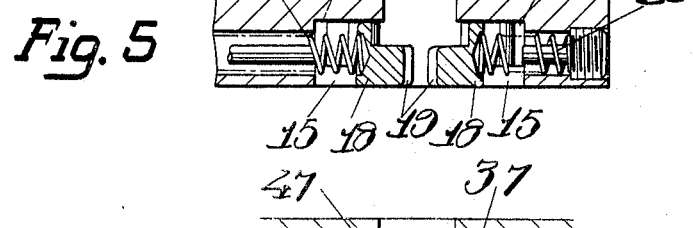
FIG. 5 shows an enlarged cross-sectional view of the same taken along the line V—V in FIG. 3.
Figure 6:
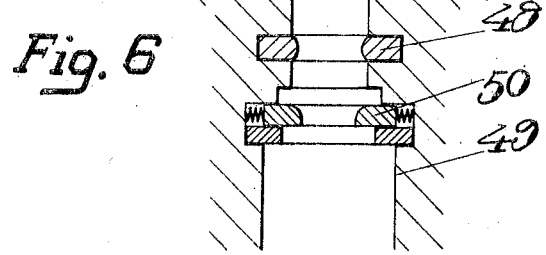
FIG. 6 shows an enlarged side view of a sizing die.

A series of press molding processes in a press molding apparatus in the present invention will be disclosed hereinunder:

(1) The first one of metalic molding materials $a$ arranged in a row inside a material feed passage 23 is slidingly transferred onto a free upper end of a rod 32 just positioned in alignment with the under wall of said passage 32 as shown in FIG. 1b by force of a spring 33 simultaneously when a hydraulic piston 29 is ascended.

(2) At the next moment, the hydraulic piston 29 and the piston rod 30 are descended by pressure of compressed air supplied into the cylinder 25 from a air supply pipe 26 and the under free end of the piston rod 30 presses the metalic molding material $a$ placed on the free end of the rod 33. Said metalic molding material $a$ is pushed to be carried downwards from the feed opening 24 according to the descending motion of the piston rod 30 and the rod 32 as it is arrested between these two rods 30 and 32, and then pushed out onto a fixed position of the press bed member 3. By this time, the rod is descended against the spring 33 to the limit and submerged its free end inside the press bed member 3.

Meanwhile, as the actuating member 42 is in a descending motion, each of punching member 43 to 46 is descended to push respective of half-finished products into each of dies 34 to 37 through respective of guide plates 38 to 42 and clamping arms 19 of clamping plates 18, and until they are descended to the limit, a transfer plate member 6 is comparatively rapidly slid to move towards the left direction or the material feed direction by rotation of a cam 12 interacted with a spring 9, so that respective of a pair of clamping arms placed above respective dies 34 to 37 is moved to the left from respective principal positions.

(3) While the transfer plate member 6 is being moved, the actuating member 42 reaches to the limit of descent and is turned to be ascended, and therefore respective of punching members being under control of said actuating member 42 is also ascended. The punching member 43 and 44 are ascended as they are carrying half-finished products contained in dies 34 and 35 and pushed upwards by ejectors 34a and 35a which are ascended by springs in synchronism with the ascending motion of the actuating member 42, and further ascended upwards through the press bed member 3 and the guide plate member 5 after locating half-finished products at right positions extending respective dies on the press bed member 3 by means of the strippers 38 and 40. The half-finished product contained inside the die 37 is finally processed therein and discharged downwards.

It must be noted that one time of the vertical motion of the actuating member 42 descending and ascending the punching members is performed in cooperate with the transfer of a metalic molding material to the feed position located on the upper surface of the press bed member 3.

Thus, a metalic colding material and half-finished products are left at their positions until they are carried by clamping arms which is performed succeedingly.

The transfer plate member 6 is in a sliding motion to the left direction.

The sliding motion of the transfer plate member 6 comes to an end immediately after replacement of half-finished products drawn from the dies is finished and stayed there until works of the clamping arms is done. Meanwhile, a pair of clamping arms 19 located above the die 34 approaches on the both sides of the metalic molding material to catch said material by the arms. Other clamping arms do same works in respective sections. That is; a pair of clamping arms formerly located above the die 35 is moved leftwards to catch the half-finished product placed on the die 34.

(4) Immediately when the clamping work of the clamping arms is finished, the transfer plate member 6 is slid to the opposite direction by fuinction of the cam 12 and the spring 9 and restored to its position. As the result, the metalic molding material and half-finished products are respectively carried to the neighboring positions by clamping arms being reciprocated in accordance with the sliding motion of said transfer plate member 6.

Simultaneously when the metalic molding material is transferred from the feed position, compressed air fieled inside the cylinder 25 is discharged out from the air supply pipe 26 and the hydraulic piston 29 and the piston rod 30 are pushed upwards by the spring 28. At the same time, the rod 32 is also pushed upwards to position its free upper end in alignment with the under wall of the metalic feed passage 23 and receive a metalic material newly fed. Thus, the process mentioned in item 1 is repeated.

A little later since the transfer plate member 6 began to be slid to the reverse direction and before the clumping arms are restored to their positions, the actuating member 42 is ascended up to the ascent limit and turned into a descending motion to move the punching members downwards.

(5) The ejectors 34a and 35a receiving a metalic molding material and a half-finished material on their free ends are descended simultaneously when or a little before the free under ends of respective punching members 43 and 44 touch to compress said material and product, whereby the metalic molding material and half-finished product are put into respective dies.

The operation described in items 1 through 5 is performed in accordance with one revolution of the rotary axis 11 and one vertical motion of the actuating member 42, and the compressed air supply and discharge to and from the cylinder 25 relating to feed of a metallic material is also performed in concord with the above operations of the rotary axis 11 and the actuating member 42.

In the accompanying drawings, FIGS. 7 I to IV shows enlarged illustrations of dies in a basic embodiment of a press molding apparatus of the present invention.

In FIG. 7, (I), a die 34 has an inner diameter designed in a size smaller than an outer diameter of a metallic molding material $a$ to be fed and substantially similar to an outer diameter D of a finished product $e$ or a little smaller than D. A punching member 43 has an enlarged upper part and a slender under part having a diameter substantially similar to an inner diameter D' of a bore of said finished product $e$ and a longitudinal length being not long enough to touch a free upper end of an ejector 34a serving for the bottom surface of the die 34, when the member 43 is descended to the limit.

In this instance, a metallic molding material $a$ pushed into said die 34 by the punching member 43 is pressed and squeezed by said punching member 43 as shown in the same drawing and molded into a blind tubular rough product $b$ having an outer diameter substantially similar to that D of the tubular finished product $e$ and a length being a little larger than the length L of said finished product $e$.

This is an example of a single process by one die, and this single process may be replaced for several processes by additional arrangements of desired numbers of dies, punching members and clamping plates in corresponding numbers. In this case, the additionally equipped punching members must be arranged in such an order from a smaller one to a larger one having an outer diameter substantially similar to the inner diameter D' of the bore of the tubular finished product $e$.

The drawing I' in FIG. 7 shows an example of a punching member with step 43' being adoptable for the purpose of forming step in a bore of a finished product $e$. The punching member 43' has an intermediate part of an enlarged diameter and an under part of a smaller diameter fixedly inserted thereinto, each of which has a diameter substantially similar to respective of diameters of an enlarged part and a smaller part of a stepped bore of a finished product $e$ so that a metallic molding material is squeezingly molded into a blind tubular rough product $b'$ having a bore with step by thrusting said punching member 43' into said material contained in a die. For further process of this blind tubular rough product having a stepped bore, punching members 44 and 46 having configuration closely resemble to that of said punching member 43' are employed in the second and the fourth stages, and in the third process, the punching member 45 having the smaller diameter identical with that of the smaller part of the stepped bore of the finished product is employed. Process in this instance is performed in the same way as the following work which will be disclosed referring to the drawings.

In the drawing II of FIG. 7, a die 35 has an inner diameter identical with the outer diameter D of the tubular finished product $e$. A punching member 44 is composed of an outer member 44a slidingly movable along an inner member 44b. Said outer member 44a has an outer diameter identical with said outer diameter D of the finished product $e$ and a longitudinal length being long enough to form a length identical with a longitudinal length L of the finished product $e$ between the free under end thereof and the free top end of an ejector 35a when the punching member 44 is descended into the die 35. Said inner member 44b has an outer diameter identical with the inner diameter D' of the finished product $e$ and a longitudinal length a little shorter than that of the punching member 43 in the drawing I.

In this section, when the blind tubular rough product $b$ is pushed into the die 35 by the punching member 44, the upper end part of said product $b$ having rough edge and uneven thickness is compressed into a refined flat end surface having a uniform thickness by a flat surface of the under end of the outer member 44a of the punching member 44, which is shown in the drawing II. By the way, surplus materials and refuses left from the main body of the blind tubular rough product in this press process are pushed into a space formed between the inside surface of the bottom of the blind tubular rough product $b$ and the free under end of the inner member 44$b$ and heaped to form a projection C' therein. Thus, the blind tubular rough product $b$ is molded into a blind tubular intermediate product C having an improved outer diameter and length.

In the drawing III, a die 36 has an inner diameter identical with that of the die 35 and a bottom surface centrally provided with a hole 36$a$ whose diameter is substantially similar to the inner diameter D' of the bore of the finished product $e$. A punching member 45 is provided its free under end with a head 45$a$ having a diameter identical with the inner diameter D' of said finished product $e$ and being insertedly thrust into said hole 36$a$, when the punching member 45 is descended into said die 35.

When the blind tubular intermediate product C is pushed into the die 36, the punching member 45 is further thrust into the die 36 until the head 45$a$ is passed through the hole 36$a$. Thus, the bottom of said product C and the projection C' of the surplus and refuses of a metalic material formed therein are completely hollowed out, and a complete tubular half-finished product $d$ is molded. Said half-finished product $d$ is detached from the die 36 and carried upwards by the punching member 45 when it ascends.

In the drawing IV of FIG. 7, 37 indicates a die having a larger upper hollow 47 connected to the bottom part with a more enlarged under hollow 49. Said hollow 47 is provided with a sizing ring 48 having an inner diameter exactly identical with the outer diameter of the finished product $e$, and said enlarged hollow 49 is provided with a stripper 50 being sprung towards the center thereof. The punching member 46 has an upper part having a larger diameter and an under part having a smaller diameter identical with the diameter D' of the finished product $e$ and a comparatively longer length, and at a part connecting the larger upper part with the smaller under part a shoulder 46$a$ is formed.

The complete tubular half-finished product $d$ is pushed into the die 37 by the punching member 46 and forcibly passed through the sizing ring 48, where a finish of the outer and inner diameter of said half-finished product $d$ is done. Thus, the tubular finished product $e$ having extremely precise inner and outer diameters is produced. Said finished product $e$ is further pushed to forcibly pass through the stripper 50 and discharged downwards by engagement of said stripper 50.

FIG. 8, I to IV show another embodiment of a press molding process including a bevelling process tapering inside peripheral edges of a finished product $e1$ in a press molding apparatus of the present invention.

In the drawing I of FIG. 8, a die 34 and a punching member 43 are exactly similar in their configurations and their works to those in I of FIG. 7.

In the drawing II, a die 35 has a configuration similar to that in II of FIG. 7, but a small conical projection 51 is provided onto the upper end of the ejector 35$a$ serving for the bottom of the die 35.

A punching member 44 is a solid body that an outer member 44$a$ having a small conical projection 52 at the under end and an inner member 44$b$ are fixedly united.

The blind tubular rough product $b$ contained in the die 35 is pressed by the punching member 44, and bevelled surfaces E'' are formed around the inside periphery of both ends of the rough product $b$ by agencies of the conical projections 51 and 52. Moreover, a projection C' of surplus and refuses of a metalic materials is formed on the inside surface of the bottom part slightly projected inwardly. Thus, the blind tubular rough product $b$ is molded into a bottomed tubular intermediate product C1 having bevelled ends.

In the drawing III of FIG. 8, a die 36 has a bottom bevelled in the similar configuration to that of said conical projection 51 at the periphery of a central hollow connecting to a hole 36$a$. Other details in configurations of a punching member 45 and molding process are the same as in the case of III in FIG. 7.

In the drawing IV of FIG. 8, a punching member 48 has a shoulder 46$a$ provided with a conical projection 54 having a configuration similar to that of said conical projection 52. Other details on configuration of a die 37 and a finishing process amending the outer diameter of a half-finished product $e1$ are the same as in the case of IV in FIG. 7.

FIGS. 9 I to IV show a further embodiment of a molding process including a bevelling process $e''$ producing bevelled surfaces at outer peripheries of both ends of a finished product $e2$ in a press molding apparatus in the present invention.

In this example, no particular description is given since details in any aspects applies to those in FIG. 8 I to IV and these drawings may be duly and completely understood at a glance.

A finished product $e3$ shows an example bevelled at the inner and outer peripheries of both ends by a process modified from FIGS. 8 and 9.

FIG. 10, II shows another modified example which may be a substitute of the processes of II of FIGS. 7 to 9 producing a blind tubular intermediate product having a projection of surplus metalic materials around the bottom part thereof, wherein a die 35 is provided with a solid bottom surface, at which central part a hole 55 having a diameter a little or more smaller than inner diameters D' of finished products $e$ to $e2$ is hollowed out, and a punching member 44 includes an inner member 44$b$ provided with a projection 56 having a small diameter at the central part of the free under end thereof according to the necessity.

When the punching member 44 is pushed to press the blind tubular rough product $b$ contained inside the die 35, surplus and refuses of a metalic material squeezed out by the punching member 44 are pushed downwards through the hole 55 and heaped to form a projection C', which is just put into the hole 36$a$ provided at the die 36 in the following process and punched away together with the bottom part of the intermediate product $c$.

What is claimed is:

1. A method of producing a tubular body from a cylindrical metalic material in cold working: comprising pressing the cylindrical metallic material having volume slightly larger than that of the tubular body into a tubular body having inner and outer diameters substantially equal to those of the firstly-mentioned tubular body and having a blind end, the other open end being remained unpressed; compressing the secondary-mentioned tubular body from the both ends thereof into a tubular body having a longitudinal length substantially equal to that of the firstly-mentioned tubular body, while keeping outer and inner diameters thereof as they are, surplus of the metalic material left by the compression being projected onto the blind end along the axial direction of the tubular body and within a diameter corresponding to that of the most reduced part of the inner diameter of the firstly-mentioned tubular body; and punching through the thirdly-mentioned tubular body produced to have the outer and inner diameters and the longitudinal length substantially equal to those of the firstly-mentioned tubular body along the axial direction and in the diameter corresponding to that of the most reduced part of the inner diameter thereof, blind end thereof being punched through with the surplus of the metalic material projected thereon in the afore-mentioned diameter.

2. A method of producing a tubular body from a cylindrical metalic material in cold working as claimed in claim 1, further comprising forcibly passing the thirdly-mentioned tubular body having a punched blind end through a die having an inner diameter identical with the outer diameter of the firstly-mentioned tubular body by a rod having an outer diameter identical with the inner diameter of the firstly-mentioned tubular body, whereby the inner and outer diameters of the thirdly-mentioned tubular body are precisely adjusted under pressure to those of the firstly-mentioned tubular body.

3. A method of producing a tubular body from a cylindrical metalic material in cold working as claimed in claim 1, wherein each processes in the processing system including pressing, compressing and punching the material and the first supply of the material into said processing system are operated at positions placed in line with regular intervals therebetween, and the material supplied into the processing system is transferred intermittently to successive processing positions in the system.

4. An apparatus for producing a tubular body from a cylindrical metalic material in cold working comprising; a first process section including at least a punching member having an outer diameter substantially similar to that of an inner diameter of a tubular finished product and a die having an inner diameter substantially similar to an outer diameter of said tubular finished product, each of which is operable in pairs, said punching member being arranged so that a free under end of a slender under part is kept from touching with a free upper end of an ejector inserted into said die from the bottom part thereof so as to form a narrow gap serving to formation of a bottom of a metalic molding material and an upper end fixedly secured with an enlarged upper part and formed a step therein is kept said step from pressing an upper end of a metalic molding material contained in said die when the punching member is descended to be pushed into the die to the limit, whereby said metalic molding material contained in said die is molded into a blind tubular rough product having a blind under end and a rough upper end; a second process section including at least a punching member positioned in alignment with the punching member of the first section and a die positioned in alignment with that of the first section, each of which is operable in pairs and has similar outer and inner diameters to those of the punching member and the die of the first process section, said punching member including an inner member having a longitudinal length permitting to forming a space between an free under end thereof and an inside surface of the blind end of said blind tubular rough product being supported an outside surface thereof by the free upper end of the ejector inserted into the die and an outer member provided along said inner member and pressing with its under end formed at an upper end of said inner member the rough upper end of the blind tubular rough product contained in the die so as to produce a longitudinal length identical with that of a finished product when the punching member is descended to be pushed into the die; and the final press section including a die having an inner diameter similar to those of dies in the first and second process sections and a punching member being inserted into said die and having a free under end having a diameter identical with that of a smallest part of the inner diameter of the tubular finished product.

5. In an apparatus as claimed in claim 4, wherein said die provided in the second press section has the inner diameter similar to that of the die in the first section and a bottom part extending to a smaller space being provided at the central part thereof and having a diameter smaller than that of the smallest part of the inner diameter of the tubular finished product.

6. An apparatus as claimed in claimed 4 comprising; a material feed members including a material feed passage extending in a slope along a wall to a feed opening and being adapted so as to accommodate and feed a metalic molding material in a row, said feed opening vertically extending and having an upper passage connecting to an enlarged cylindrical passage whose upper end is covered and provided with an air supply pipe and an under passage opening to a slot and including a rod, said enlarged passage including a hydraulic cylinder being movable downwards by pressure of compressed air supplied from said air supply pipe and descending a piston rod being connected at an upper end thereto through a shoulder and having a free under end serving for an upper wall of said feed opening when the piston rod is descended and holding a material fed from said passage, said shoulder controlling excessive descent of said piston rod, said rod having an free upper end serving for an under wall of said feed opening when it ascended by a spring secured thereunder and receiving a metalic molding material fed from said feed passage thereon, and said piston rod and said rod being vertically moved in respondence with each other so that said material may be transfered to a fixed position on a press bed; a transfer plate member having an elongated configuration and being mounted on a press bed member mounted with a plurality of dies at a regular distance, said transfer plate member supported at a right end portion with a shaft connecting to a rod hatched both ends thereof with springs and at a left end portion pivoted by a roller slidingly rotatable by agency of a cam rotating and by rotation of a rotary shaft and being slidingly reciprocated by interaction of said spring and said cam; a clamping means accommodated at positions corresponding to respective dies and punching members inside respective of grooves engraved in the form of a reverse $u$ against two paralleled side walls of a slot engraved along the elongated direction of said transfer plate member, said pair of clamping plates pivoted at one end to said transfer plate member and projected a pair of clamping arms formed at other end into said slot, said pair of clamping arms being moved to a metalic material according to a reciprocating motion to a material feed direction to clamp the metalic material and restored to their positions by return of said plate member; and a plurality of punching members, a plurality of dies and a plurality of a pair of clamping plates composing one process in combination of one punching member, a die and a pair of clamping arms which is respectively positioned on a vertical axial line, and said punching members, said dies and said clamping plates respectively mounted at a regular distance in alignment on respective of horizontal lines.

References Cited

UNITED STATES PATENTS 2,586,336   2/1952   Huck _____ 72—354
3,078,566   2/1963   Egan _____ 72—354

CHARLES W. LANHAM, Primary Examiner

U.S. Cl. X.R.

72—354,404